(12) United States Patent  
Sanchez Ruiz

(10) Patent No.: US 9,248,916 B2  
(45) Date of Patent: Feb. 2, 2016

(54) AERIAL REFUELING INDICATION SYSTEM AND METHOD

(71) Applicant: EADS Construcciones Aeronauticas S.A., Getafe (ES)

(72) Inventor: Unai Sanchez Ruiz, Getafe (ES)

(73) Assignee: EADS Construcciones Aeronauticas S.A., Getafe (ES)

( * ) Notice: Subject to any disclaimer, the term of this patent is extended or adjusted under 35 U.S.C. 154(b) by 0 days.

(21) Appl. No.: 14/290,101

(22) Filed: May 29, 2014

(65) Prior Publication Data

US 2014/0358335 A1 Dec. 4, 2014

(30) Foreign Application Priority Data

May 31, 2013 (EP) .................................... 13382208

(51) Int. Cl.
*B64D 39/00* (2006.01)

(52) U.S. Cl.
CPC ...................... *B64D 39/00* (2013.01)

(58) Field of Classification Search
CPC ........ B64D 39/00; B64D 39/02; B64D 45/00; B64D 39/04; B64D 39/06; B64D 37/16; B64D 37/30; G08G 99/00
See application file for complete search history.

(56) References Cited

U.S. PATENT DOCUMENTS

| 3,008,674 | A | 11/1961 | Abraham |
| 2005/0103938 | A1 | 5/2005 | Butsch et al. |
| 2009/0015436 | A1* | 1/2009 | Lundberg et al. ............. 340/945 |
| 2009/0032711 | A1* | 2/2009 | Hewitt et al. .............. 250/341.8 |
| 2010/0072320 | A1 | 3/2010 | Bartov |
| 2012/0153084 | A1 | 6/2012 | Etzkorn et al. |

FOREIGN PATENT DOCUMENTS

WO 2010118131 10/2010

OTHER PUBLICATIONS

Royal Air Force "ATP-56 (B) Part 5", Apr. 30, 2011.
European Search Report, Nov. 26, 2013.

* cited by examiner

*Primary Examiner* — Rodney Butler
(74) *Attorney, Agent, or Firm* — Greer, Burns & Crain Ltd.

(57) ABSTRACT

An indication system and method for detecting and displaying the relative position during fuel transfer. The system comprises a first input device configured to be capable of detecting the extended length from the tanker aircraft of elongated hose and to be capable of sending the detected length of elongated hose to the control module. The control module is operably connected to a display and configured to be capable of receiving an input signal from the input device of hose extension, transforming it into a corresponding output signal of the position of the receiver aircraft inside a refueling range of limit positions and sending the corresponding output signal to the display, which is configured to be capable of displaying information indicating the position of the receiver aircraft inside the refueling range of limit positions.

16 Claims, 4 Drawing Sheets

AERIAL REFUELING INDICATION SYSTEM AND METHOD

CROSS-REFERENCES TO RELATED APPLICATIONS

This application claims the benefit of the European patent application No. 13382208.0 filed on May 31, 2013, the entire disclosures of which are incorporated herein by way of reference.

BACKGROUND OF THE INVENTION

The present invention is directed to an indication system and method for detecting and displaying the relative position between a tanker aircraft and a receiver aircraft during fuel transfer. The invention is intended to ensure a proper fuel transfer during the aerial refueling operations with Hose & Drogue systems.

In aerial refueling Hose & Drogue operations, the receiver pilot assumes the responsibility of conducting an engagement to enable fuel transfer, while maintaining a safe separation from the tanker. Contacts and disconnects are performed by the receiver aircraft following the indications from the refueling station. According to standard procedures, the tanker trails a hose having a free end that terminates in a reception coupling and a conical shaped drogue. Receiver aircraft are fitted with an aerial refueling probe which terminates in a fuel nozzle. Finally, the receiver aircraft is flown to engage the probe into the drogue.

This fact implies that the receiver aircraft pilot has the responsibility of getting the engagement and, after that, controlling and maintaining its relative position and speed with respect to the tanker aircraft all along the operation, from contact to disconnection. Fuel flow is started and held on to provided the engaged receiver maintains hose extension between certain maximum and minimum limits.

Currently, tanker aircraft refueling systems provide some helps for the receiver aircraft pilot to manage the operation, consisting basically of the following:
  Signal or traffic lights.
  Hose marks.
  Tunnel lights.

Regarding signal lights associated with each tanker aircraft, a set of rearward facing signal lights or display is installed, using colors red, amber and green. The lights provide indications of the operating status of the aerial refueling equipment, more specifically the refueling pod in this case. Following the standards, the color codes would be the following:
  Red light, a red light means breakaway or do not make contact.
  Amber light, amber light means clear contact.
  Green light, a green light means fuel is flowing.

All the known implementations of existing signaling lights for Hose & Drogue aerial refueling operations comply with this standard and therefore basically consist of a set of three visible colored lights or clusters and the corresponding infrared ones for covert mode.

Signal lights provide the receiver aircraft pilot with information on the status of the refueling station. Green light denotes that the receiver has pushed the drogue inside the refueling range. If the inner limit is exceeded, for instance because the receiver aircraft flies too close to the pod, the signal lights turn suddenly to flashing amber, requiring the pilot to move backwards and away and the pumps are immediately closed. If the outer limit is exceeded, for instance, when the receiver aircraft drops behind maximum refueling allowed hose extension, the signal lights turn suddenly to steady amber and the fuel pumps are closed immediately. In both cases, signal lights do not warn the pilot in advance.

Regarding hose dimension and markings, aerial refueling hoses include ring marks along certain intervals that aim to provide the receiver pilot with an indication of their deployment or retraction and their extended length during the contact as it is useful for the receiver pilot to be aware of the limits for the operation, such as the proximity to the minimum or maximum allowed hose extension, before disconnection.

Most hoses are marked with colored bands, mainly with a series of bands or a block of color to indicate the optimum receiver refueling position. On some hoses, the refueling position marks are bounded by additional markings indicating the start and stop positions for fuel flow. Usually, there is a series of closely spaced bands at the tanker end of the hose, these provide cues for the receiver pilot to assess rates of fore and aft movement after making contact or during disconnection.

Hose marking should be visible, as required by aircrew, when conducting aerial refueling operations in ambient lighting, weather and background conditions. The hose markings should provide the aircrew with visual cues relating to hose position, hose behavior, and receiver relative motion. The markings should also indicate the inner and outer limits of the refueling range and hose orientation aft of the inner refueling limit.

Hose marks are intended to provide a reference of the hose extension Inner and outer limit markings are entrusted to be clearly seen by the receiver aircraft pilot under any ambient lighting, weather and background conditions, but the fact is that it is quite hard for him to distinguish them, especially under night conditions. Several experiences confirm that the hose marks did not provide satisfactory cues for operation, as they were not visible when in contact and so could not be used for positioning, under twilight and night conditions.

Regarding tunnel lights it has to be taken into account that during night time conditions, the hose exit is illuminated from the refueling station rear part by visible lights, also known as tunnel lights. The drogue tunnel or the serving carriage of most tanker aerial refueling installations is lit from within. This is particularly useful for gauging the amount of hose pushed back into the hose drum. Additionally, the tunnel lights are intended to help view the marks on the hose when getting out of the refueling station rear fairing.

Tunnel lights are not fulfilling the function of illuminating the hose exit as expected. Therefore, at night or in degraded visual conditions, once contact is achieved, it is very hard to have a reference of the drogue position inside the refueling range, as the hose marks are nearly invisible. Refueling lights are not able to provide a precise indication of the whereabouts of the receiver aircraft inside the range, or in other words, how far away with respect to the inner or outer limit the receiver aircraft is. Tunnel lights illuminate only one small part of the hose close to the hose exit. As only a small part of the hose is illuminated, the pilot easily loses track of his position as he does not see the entire length of the hose. He is able to see marks close to the hose exit which do not give him a reference of the distance with respect to the limits.

As mentioned before, fuel flow is started and held on to provided the engaged receiver maintains hose extension inside certain maximum and minimum limits. As soon as any of those limits is exceeded, fuel flow is interrupted, and not resumed until the receiver gets back into the refueling range again and the pumps are reopened. These interruptions usually catch the pilot unaware, as the transition from fuel dispensing range to pumps closed is abrupt, and the above described help means are not totally effective to this purpose. These interruptions are extending the times to accomplish the aerial refueling operations and increasing the amount of workload required from receiver pilots.

SUMMARY OF THE INVENTION

The above mentioned drawbacks are solved by the claimed indication system and method.

The main problem that the invention tries to solve is the fact that the receiver aircraft pilot does not have enough references under night or degraded visual conditions to know his position with respect to the fuel flow limits once the probe and drogue are engaged.

The aerial refueling indication system object of the invention comprises, additionally to a display adapted to be carried by the tanker aircraft for displaying information of the aerial refueling operation to the receiver aircraft, for instance, signal lights, and the elongated hose configured to extend from the tanker aircraft, the following:

A first input device operably connected to the elongated hose configured to be capable of detecting the extended length of the elongated hose with respect to the tanker aircraft and operably connected to a control module and configured to be capable of sending the detected length of elongated hose to the control module.

A control module operably connected to the input device and to the display and configured to be capable of receiving an input signal from the input device of hose extension, transforming it into a corresponding output signal of the position of the receiver aircraft inside a refueling range of limit positions and sending the corresponding output signal to the display.

A display operably connected to the control module and configured to be capable of displaying information indicating the position of the receiver aircraft inside the refueling range of limit positions.

It is also an object of the claimed invention to provide a method for displaying information of the aerial refueling operation to a receiver aircraft, the method comprising the following steps:

detecting by a first input device the extended length of the elongated hose with respect to the tanker aircraft, sending the detected elongated hose length to a control module from the first input device, transforming, by means of the control module, the detected length into a corresponding output signal of the position of the receiver aircraft inside a refueling range of limit positions, sending the corresponding output signal from the control module to a display, displaying by means of the display, the information indicating the position of the receiver aircraft inside the refueling range of limit positions.

The claimed system and method displays information regarding the extended hose to the receiver aircraft pilot in order to help to maintain it inside refueling range during fuel transfer and therefore reducing workload, enhancing safety and performances of the operation.

The claimed invention will provide not only the pod status information provided by the current signal lights, but also precise indication of the position inside the refueling range by displaying any symbols considered as appropriate by the receiver pilot community. This will let the receiver pilot know at any time his position with respect to the outer or inner limit, and therefore prevent in advance interruptions of fuel flow that increase operation time per receiver.

Moreover, another advantage of the invention is that the receiver aircraft pilot would only need to follow indications from the display, rather than keeping attention on different points as signal lights or hose marks, thereby reducing pilot workload.

The visual information would be displayed to the user and would be visible under any lighting conditions.

DETAILED DESCRIPTION OF THE PREFERRED EMBODIMENTS

Figure 4:
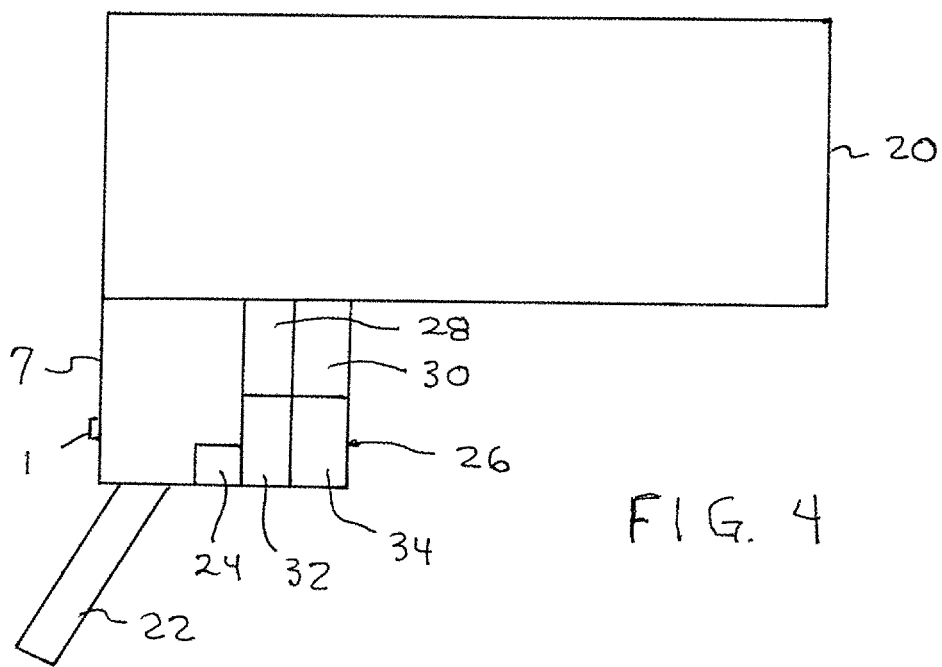
FIG. 4 is a schematic view of the aerial refueling indication system of the invention and tanker aircraft.

As shown schematically in FIG. 4, the aerial refueling indication system comprises, additionally to a display (1) adapted to be carried by a tanker aircraft (20) for displaying information of the aerial refueling operation to a receiver aircraft, for instance, signal lights, and an elongated hose (22) configured to extend from the tanker aircraft, the following:

A first input device (24) operably connected to the elongated hose (22) configured to be capable of detecting the extended length of the elongated hose with respect to the tanker aircraft (20) and operably connected to a control module (26) and configured to be capable of sending the detected length of elongated hose to the control module.

The control module (26) operably connected to the input device (24) and to the display (1) and configured to be capable of receiving an input signal from the input device of hose extension, transforming it into a corresponding output signal of the position of the receiver aircraft inside a refueling range of limit positions and sending the corresponding output signal to the display.

The display (1) operably connected to the control module (26) and configured to be capable of displaying information indicating the position of the receiver aircraft inside the refueling range of limit positions.

It is also an object of the claimed invention to provide a method for displaying information of the aerial refueling operation to a receiver aircraft, the method comprising the following steps:

detecting by the first input device (24) the extended length of the elongated hose (22) with respect to the tanker aircraft (20), sending the detected elongated hose length to the control module (26) from the first input device (24), transforming, by means of the control module (26), the detected length into a corresponding output signal of the position of the receiver aircraft inside a refueling range of limit positions, sending the corresponding output signal from the control module (26) to the display (1), displaying by means of the display (1), the information indicating the position of the receiver aircraft inside the refueling range of limit positions.

The display (1) object of the invention, additionally, would allow depicting other information relevant to the Hose & Drogue aerial refueling operations, such as error reports, fuel data, elapsed time, time to go or tactical information. In order to do that, the system also comprises a second input device (28) operably connected to the control module (26) and to a memory unit (30). Said memory unit (30) is configured to be capable of recording data of the refueling operation such that the second input device (28) is configured to be capable of sending information of the refueling operation to the control module (26). This information would also be displayed.

The possibility of displaying information of the refueling operation to the receiver aircraft in a unique display provides an easily visible, complete and more accurate information of refueling status, relative position or speed, under all expectable operational conditions.

The control module (26) comprises a data memory (32) storing a set of patterns or sequences of patterns to be displayed depending on the input signal, coming either from the first (24) or the second (28) input device. The sequences could be composed of any combination of N patterns out of the locally memorized ones, displayed at any time interval.

The input signals would basically be the hose extension, information of the refueling operation and also a synchronization signal to coordinate with the signal or traffic lights the trigger of the flashing patterns.

The control module (24) also comprises a controller (34) operably connected to the data memory (32) configured to be capable of triggering the appropriate pattern or sequence of patterns according to the input signal.

The display (1) can be located in the tanker aircraft (20), more specifically in a unit (7) for aerial refueling attachable to said tanker aircraft.

Figure 1:
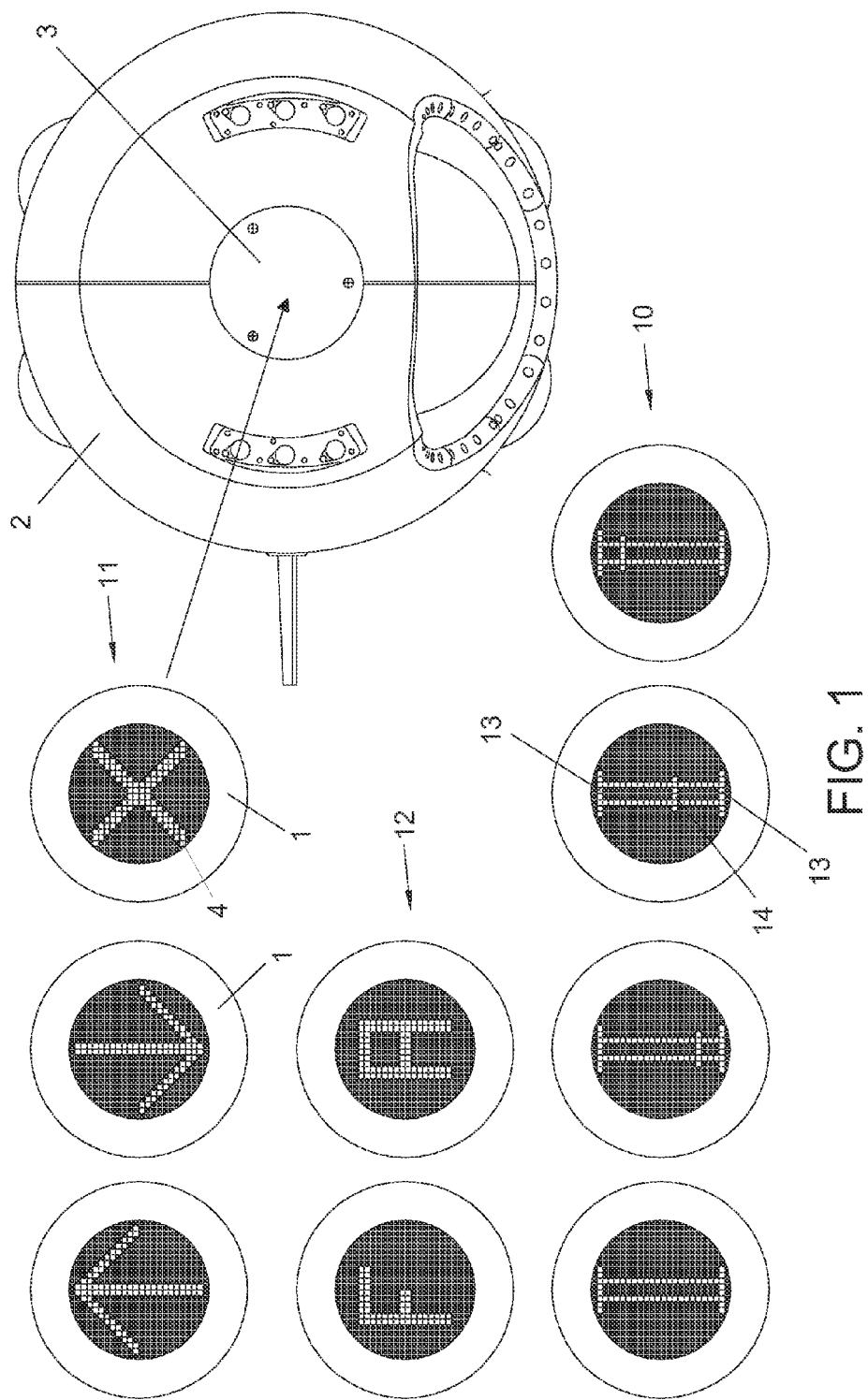
FIG. 1 is a schematic view of a front part of a Pod and a first embodiment of the invention.

FIG. 1 discloses a first embodiment of the claimed invention. The display (1) is located at a Pod (2) rear plate (3). The display (1) comprises a set of light emitting devices (4) and the system comprises a light emitting driver (8), both being configured to be capable of individually controlling each light emitting device (4).

More specifically, the embodiment discloses a display (1) having LEDs controlled individually in color and intensity. This approach would provide a fully flexible, programmable platform to display any iconic image or sequence of images, allowing a dynamic combination of iconic symbol sequences, display speed and colors.

Used LEDs may also be infrared, in order to enable the use of the system in night covert operations. The images displayed by the LEDs would be visible only with Night Vision Goggles (NVGs). The images displayed would be monochrome.

The display (1) comprises an array of LEDs mounted on a rigid or flexible plane to be adapted to any required surface.

As shown in FIG. 1, the display (1) is able to display a pictogram showing the relative position (10) within a range of the receiver aircraft. Limits (13) of the positions of the receiver aircraft are displayed and the actual position (14) of the receiver aircraft within the range is also displayed. It is also possible to display other symbols (11) or letters (12), thus offering the flexibility to provide any other information relevant to the Hose & Drogue aerial refueling operations.

The display (1) may be mounted on a flat or curved surface. The set of light emitting devices (4) might be linear, rows and columns, or radial, concentric rings, depending on the predominant shape of the patterns, circular or square.

Figure 2:
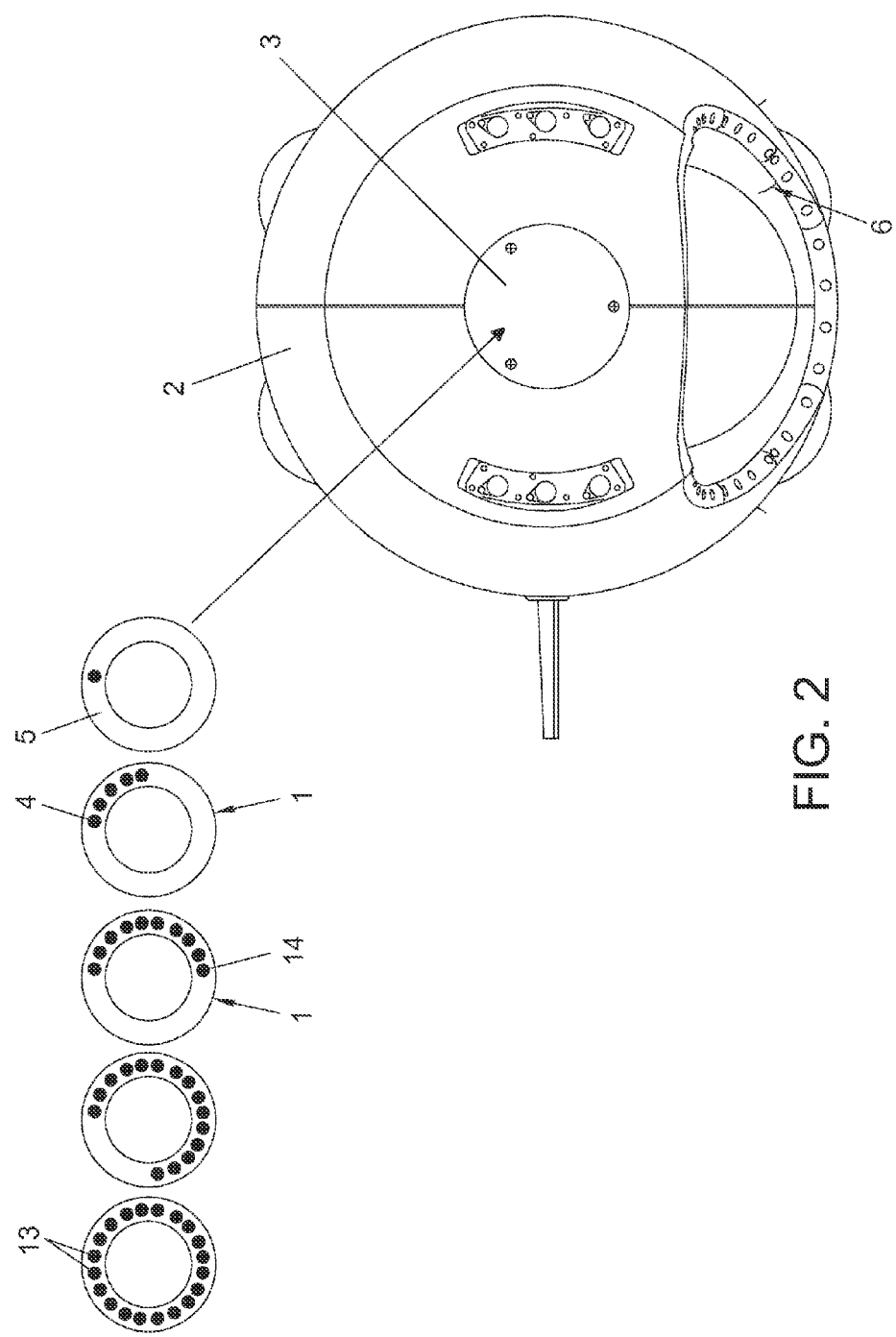
FIG. 2 is a schematic view of the front part of the pod of FIG. 1 and a second embodiment of the invention.

FIG. 2 shows a second embodiment of the invention, showing a different display (1). The display (1) is also located at the Pod (2) rear plate (3). But in the second embodiment the display (1) comprises a set of light emitting devices (4) distributed along a crown (5) for displaying the relative position of the receiver aircraft inside the refueling range. The ring may represent the actual position (14) of the receiver aircraft, a full ring would be equal to the outer limit (13), a half ring to a half way position within the range, and one LED to the inner limit (13).

The combination of the embodiment of FIG. 1 and FIG. 2 is also possible, thus providing the possibility of displaying on the same platform any information of the aerial refueling operation and its position within the refueling range.

Figure 3:
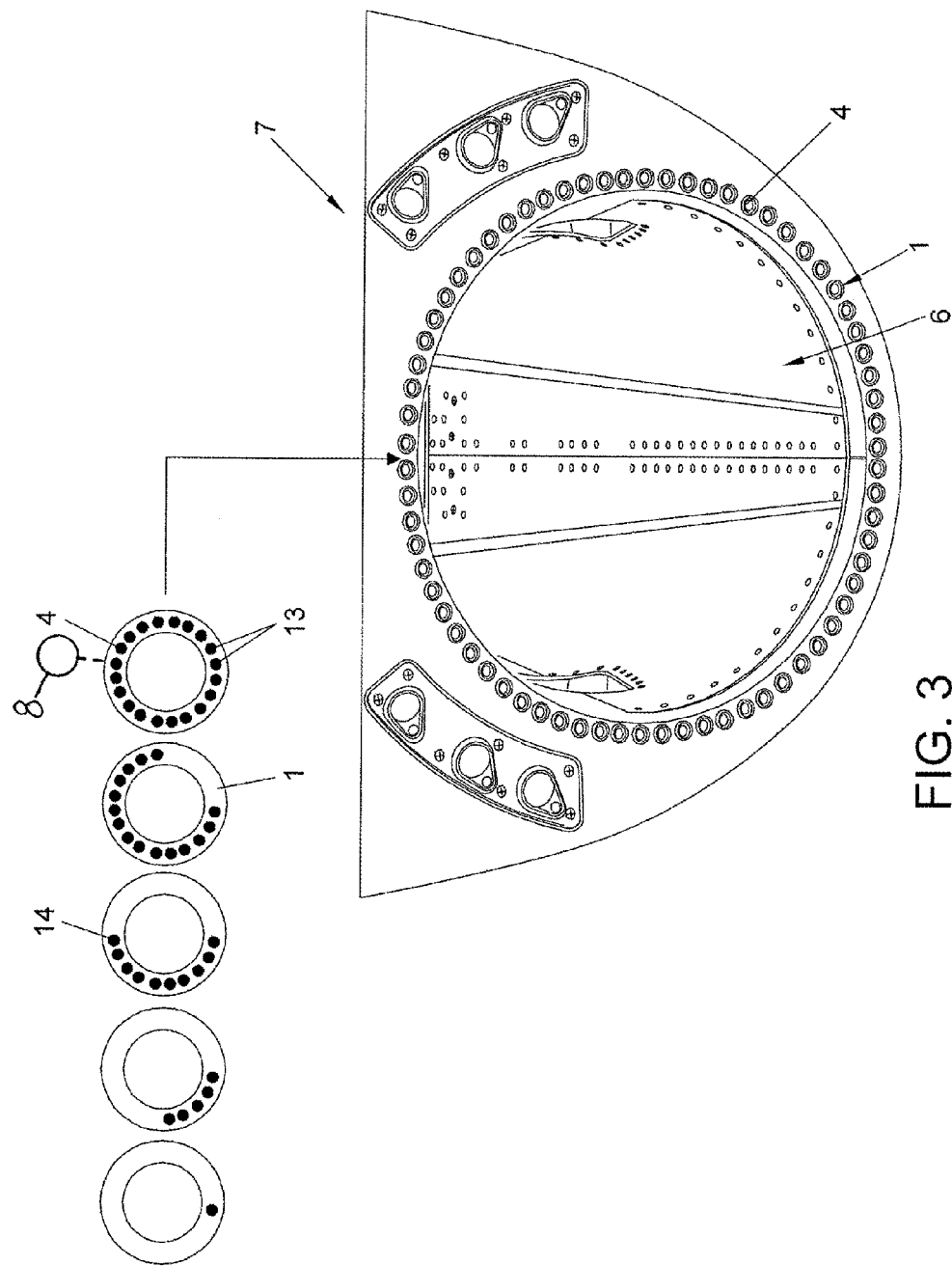
FIG. 3 is a schematic view of the hose exit of the Fuselage Refueling Unit and a third embodiment of the invention.

FIG. 3 discloses another embodiment of the invention where the display (1) is located around a hose exit (6) fitting the LEDs array into the Fuselage Refueling Unit (7) fairing, in order to display the information along a ring around the hose exit (6) to the receiver A/C pilot. Although not represented, the display (1) would also be located around the hose exit (6) of a Pod (2).

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aerial refueling indication system comprising:
  a display adapted to be carried by a tanker aircraft for displaying information of the aerial refueling operation to a receiver aircraft,
  an elongated hose configured to extend from the tanker aircraft,
  a control module carried by the tanker aircraft,
  a first input device operably connected to the elongated hose configured to be capable of detecting the extended length of elongated hose with respect to the tanker aircraft and operably connected to the control module and configured to be capable of sending the detected length of elongated hose to the control module,
  the control module operably connected to the input device and to the display and configured to be capable of receiving an input signal of hose extension from the input device, transforming the input signal into a corresponding output signal of a position of the receiver aircraft inside a refueling range of inner and outer limit positions relative to a minimum and maximum distance of the receiver aircraft from the tanker aircraft and sending the corresponding output signal to the display, in order to display the relative position of the receiver aircraft within the refueling range during the fuel transfer such that the receiver pilot is made aware at any time of the relative position of the receiver aircraft within the refueling range with respect to the outer or inner limit,
  the display operably connected to the control module and configured to be capable of displaying information indicating the position of the receiver aircraft inside the refueling range of limit positions.

2. The aerial refueling indication system, according to claim 1, further comprising a second input device operably connected to the control module and to a memory unit configured to be capable of recording data of the refueling operation, the second input device configured to be capable of sending information of the refueling operation to the control module.

3. The aerial refueling indication system according to claim 1, wherein the display comprises a set of light emitting devices.

4. The aerial refueling indication system, according to claim 1, contained in a unit for aerial refueling attachable to a tanker aircraft.

5. The aerial refueling indication system, according to claim 2, wherein the control module comprises a data memory for recording a set of patterns to be displayed by the display depending on the input signal.

6. The aerial refueling indication system, according to claim 3, further comprising light emitting drivers configured to be capable of individually controlling each light emitting device.

7. The aerial refueling indication system, according to claim 3, wherein the light emitting device is an LED.

8. The aerial refueling indication system, according to claim 3, wherein the display comprises a crown comprising the set of light emitting devices along said crown for displaying the position of the receiver aircraft inside the refueling range of limit positions.

9. The aerial refueling indication system according to claim 4, wherein said unit comprises a Pod.

10. The aerial refueling indication system according to claim 4, wherein said unit comprises a Fuselage Refueling Unit.

11. The aerial refueling indication system according to claim 5 wherein the control module comprises a controller operably connected to the data memory configured to be capable of triggering the appropriate pattern or sequence of patterns according to the input signal.

12. The aerial refueling indication system according to claim 9, wherein the display is located at a rear plate of the Pod.

13. The aerial refueling indication system according to claim 9, wherein the display is located around the hose exit of the Pod.

14. The aerial refueling indication system according to claim 10, wherein the display is located around the hose exit of the Fuselage Refueling Unit.

15. An aerial refueling indication method for displaying information of the aerial refueling operation to a receiver aircraft, the method comprising the following steps:
    detecting the extended length of the elongated hose with respect to the tanker aircraft via a first input device,
    sending the detected length of elongated hose to a control module from the first input device,
    transforming the detected length into a corresponding output signal of the position of the receiver aircraft inside a refueling range of inner and outer limit positions relative to a minimum and maximum distance of the receiver aircraft from the tanker aircraft via the control module,
    sending the corresponding output signal from the control module to a display and
    displaying information indicating the relative position of the receiver aircraft within the refueling range of inner and outer limit positions via the display during the fuel transfer such that the receiver pilot is made aware at any time of the relative position of the receiver aircraft within the refueling range with respect to the outer or inner limit.

16. An aerial refueling indication system comprising:
    a display adapted to be carried by a tanker aircraft for displaying information of the aerial refueling operation to a receiver aircraft,
    an elongated hose configured to extend from the tanker aircraft,
    a control module carried by the tanker aircraft,
    a first input device operably connected to the elongated hose configured to be capable of detecting the extended length of elongated hose with respect to the tanker aircraft and operably connected to the control module and configured to be capable of sending the detected length of elongated hose to the control module,
    the control module operably connected to the input device and to the display and configured to be capable of receiving an input signal of hose extension from the input device, transforming the input signal into a corresponding output signal of a position of the receiver aircraft inside a refueling range of inner and outer limit positions relative to a minimum and maximum distance of the receiver aircraft from the tanker aircraft and sending the corresponding output signal to the display, in order to display the inner and outer limit positions as well as the relative position of the receiver aircraft within the refueling range during the fuel transfer such that the receiver pilot is made aware at any time of the relative position of the receiver aircraft within the refueling range with respect to the outer or inner limit,
    the display operably connected to the control module and configured to be capable of displaying information indicating inner and outer limit positions as well as the position of the receiver aircraft inside the refueling range of limit positions.

* * * * *